United States Patent
Zubeck

(10) Patent No.: US 6,886,721 B2
(45) Date of Patent: May 3, 2005

(54) SEALING PROBE

(75) Inventor: Michael W. Zubeck, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 10/065,823

(22) Filed: Nov. 22, 2002

(65) Prior Publication Data
US 2004/0099699 A1 May 27, 2004

(51) Int. Cl.⁷ .................................................. B67D 3/00
(52) U.S. Cl. ...................................... 222/527; 222/522
(58) Field of Search ................................ 222/522–527, 222/386, 386.5, 566–567

(56) References Cited

U.S. PATENT DOCUMENTS

| | | | |
|---|---|---|---|
| 2,040,126 A | 5/1936 | Grieve ........................ 144/330 |
| 4,168,032 A | 9/1979 | Sneider ...................... 239/327 |
| 4,573,638 A | 3/1986 | Junkers | |
| 4,776,082 A | 10/1988 | Janzer ......................... 29/598 |
| 4,817,969 A | 4/1989 | McDowell et al. | |
| 4,826,373 A | 5/1989 | Nakano ...................... 411/82.1 |
| 4,946,081 A | 8/1990 | Jacobson .................... 222/568 |
| 4,951,614 A | 8/1990 | Akkala et al. | |
| 5,116,558 A | 5/1992 | Wrobel et al. | |
| 5,125,914 A | 6/1992 | Bassin ........................ 604/275 |
| 5,214,987 A | 6/1993 | Fenton, Sr. .................. 81/460 |
| 5,249,716 A | 10/1993 | O'Sullivan .................. 222/568 |
| 5,249,899 A | 10/1993 | Wilson ........................ 411/82 |
| 5,370,273 A | 12/1994 | Rohloff et al. .............. 222/132 |
| 5,752,657 A | 5/1998 | Hogan et al. | |
| 5,928,468 A | 7/1999 | Tolson ........................ 156/578 |
| 6,186,506 B1 | 2/2001 | Kionoshita | |
| 6,328,313 B1 | 12/2001 | Teranishi et al. | |

Primary Examiner—Frederick Nicolas

(57) ABSTRACT

A sealing probe for injecting a sealant into a sealant-receiving region between a pair of members. The probe includes a hollow, sealant-releasing section, for insertion into the hole in the upper member into at least a portion of the sealant-receiving region. The sealant-releasing section has a plurality of apertures disposed about an outer wall of such section. The aperture passes through the outer wall from a hollow region within such section to the sealant-receiving region. The sealant-receiving section also includes an entrance adjacent a top portion of the sealant section for receiving a sealant and passing such sealant to the hollow region and then from the hollow region, through the apertures, to the region external the sealant-receiving region. The probe includes a first seal disposed about an upper portion of the outer wall. The first seal extends beyond the outer surface of the sealant-releasing section to prevent sealant from passing beyond such first seal to portions of the hole above such first seal. The probe includes a second seal disposed adjacent to a lower portion of the outer wall to prevent sealant from passing into the aperture in the lower member.

30 Claims, 8 Drawing Sheets

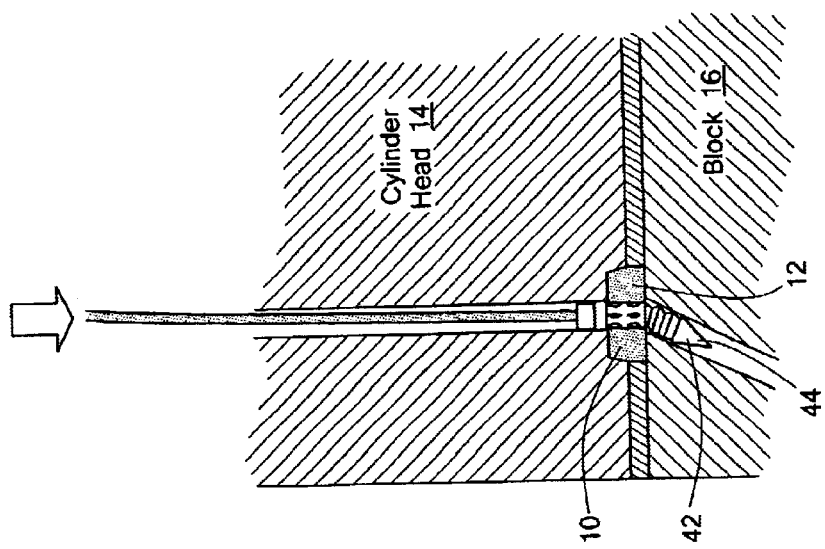
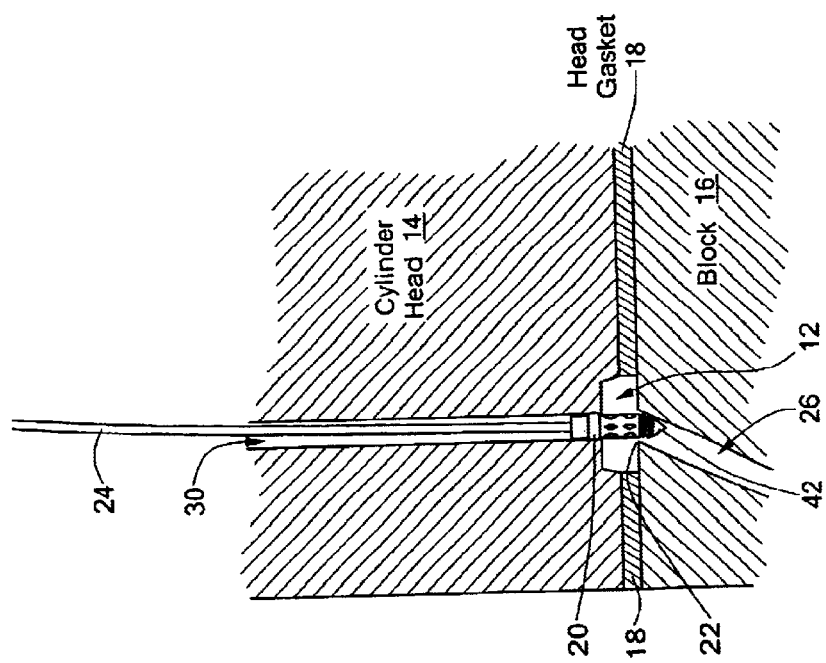
FIG. 1A
FIG. 1B

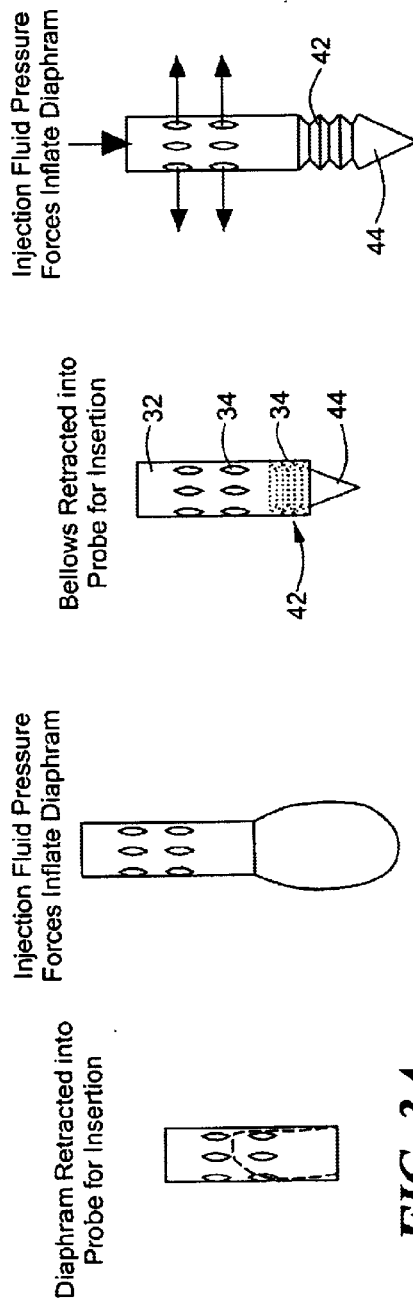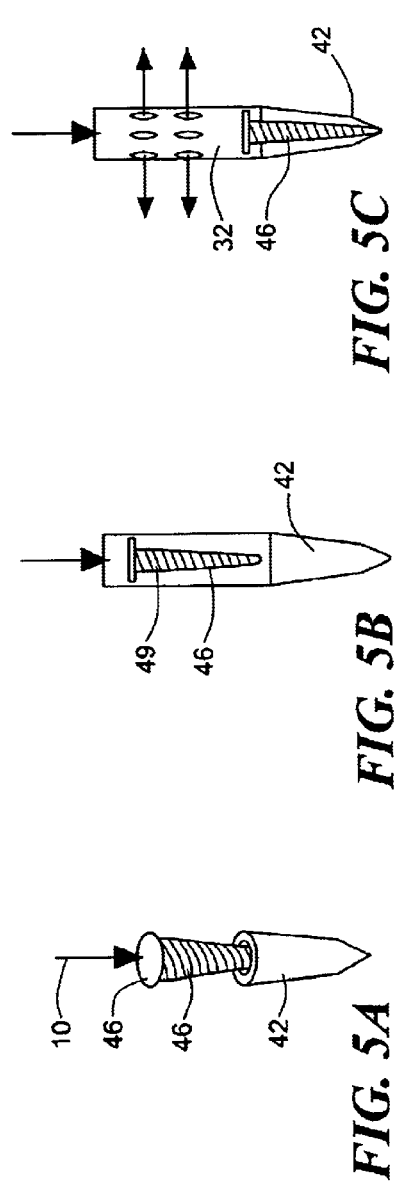

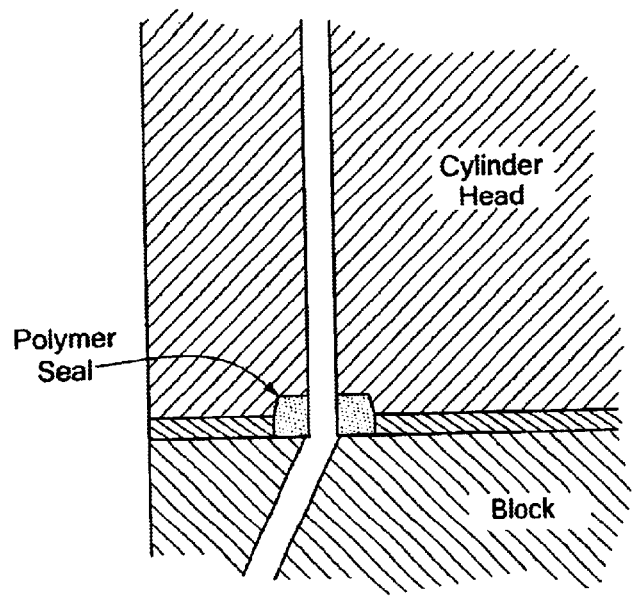
FIG. 6C
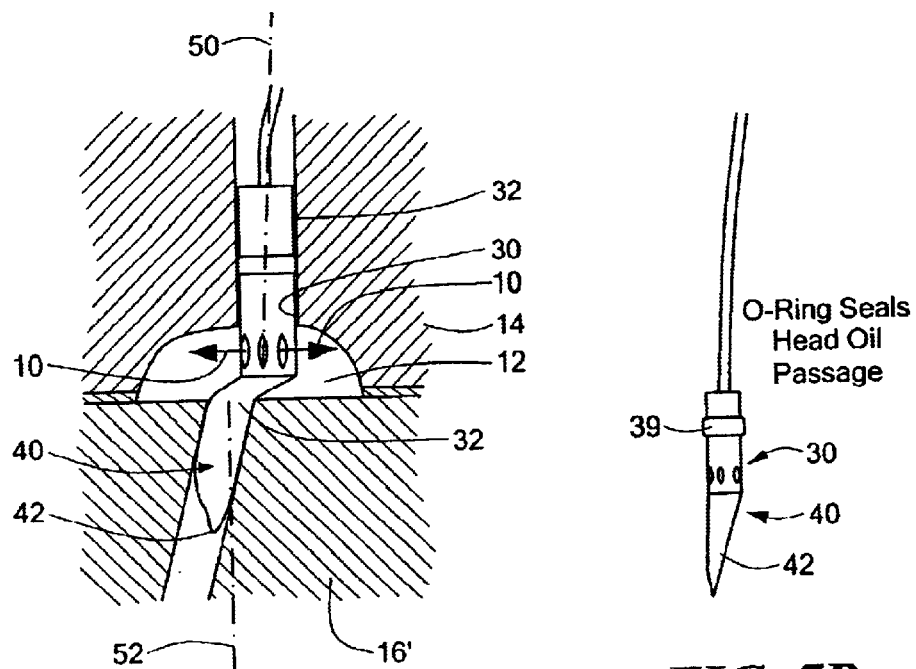
FIG. 7A
FIG. 7B

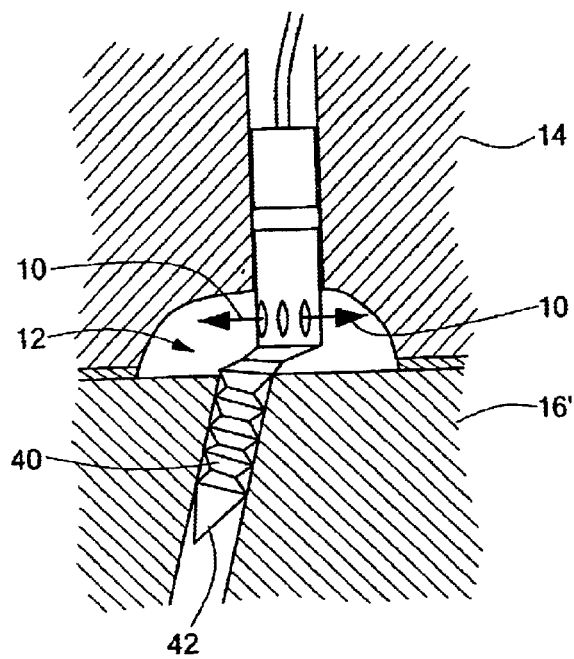
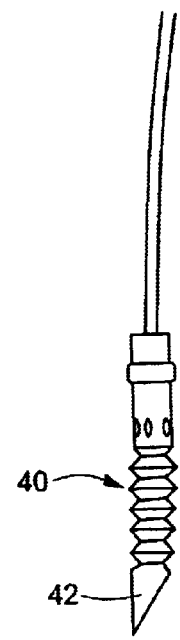
FIG. 8A  FIG. 8B
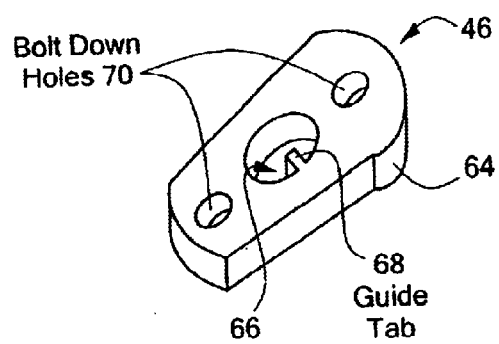
FIG. 9A

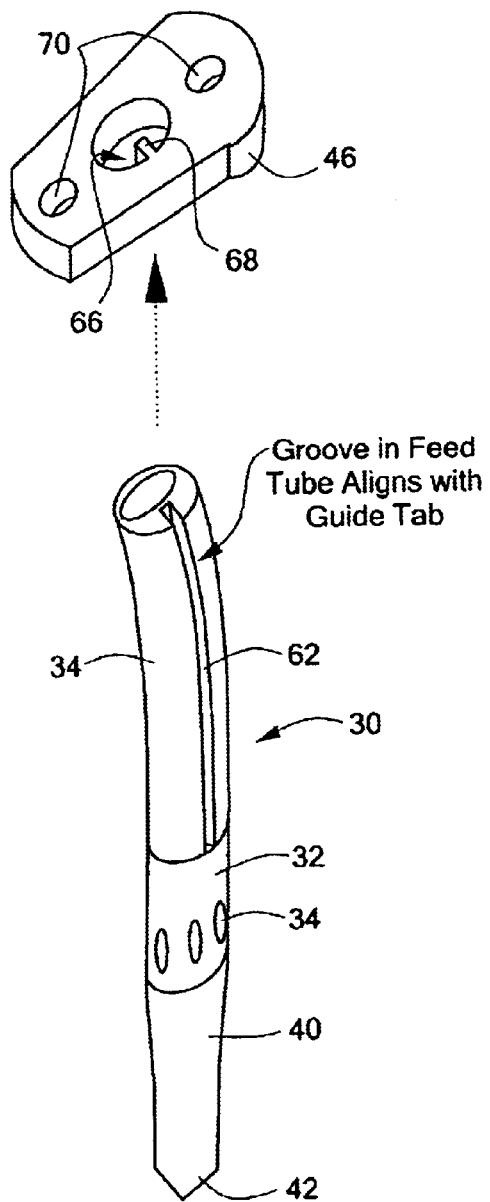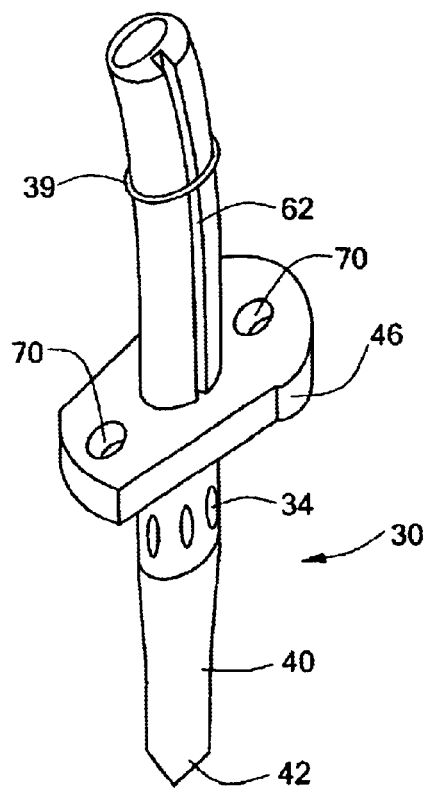
FIG. 9B
FIG. 9C

SEALING PROBE

BACKGROUND OF INVENTION

1. Technical Field

This invention relates to sealing probes, and more particularly to sealing probes for injecting a sealant into a sealant-receiving region between a pair of members is provided.

2. Background

As is known in the art, it is frequently desirable to inject a sealant between pair of members. Such injection however is difficult in applications where the sealant is remote from the place where it is to be injected. One such application, for example, is injection of the sealant at an internal joint, interface, crevices or cavity of two interfacing surfaces.

SUMMARY OF INVENTION

In accordance with the present invention, a sealing probe for injecting a sealant into a sealant-receiving region between a pair of members is provided. The probe includes a hollow, sealant-releasing section, for insertion into the hole in the upper member into at least a portion of the sealant-receiving region. The sealant-releasing section has a plurality of apertures disposed about an outer wall of such section. The aperture passes through the outer wall from a hollow, interior region within such section to the sealant-receiving region. The sealant-receiving section also includes an entrance adjacent a top portion of the sealant section for receiving a sealant and passing such sealant to the hollow region and then from the hollow region, through the apertures, to the region external the sealant-receiving region. The probe includes a first seal disposed about an upper portion of the outer wall. The first seal extends beyond the outer surface of the sealant-releasing section to prevent sealant from passing beyond such first seal to portions of the hole above such first seal. The probe includes a second seal disposed adjacent to a lower portion of the outer wall to prevent sealant from passing into the aperture in the lower member.

In one embodiment, the probe includes a flexible tube connected to the entrance of the sealant-releasing section for passing through the hole in the upper member.

In one embodiment, the first seal includes an O-ring.

In one embodiment, the probe includes a rigid tip at the lower portion thereof for introduction into the aperture.

In one embodiment, the second seal includes an O-ring.

In one embodiment the second seal includes a hollow flexible tip connected to the lower portion of the sealant-releasing section. The hollow portion is coupled to the hollow region of the sealant-releasing section for receiving sealant from the hollow region of the sealant-releasing section.

In one embodiment, the second seal includes a hollow flexible tip connected to the lower portion of the second seal and a piston disposed in the hollow flexible tip. The piston has a head in an upper region thereof and a rod at a lower portion thereof. The hollow portion is coupled to the hollow region of the sealant-releasing section for receiving sealant from the hollow region of the sealant-releasing section. The received sealant forces the head of the piston and the rod connected thereto into the flexible tip to inflate such tip.

In one embodiment, the second seal includes a hollow flexible tip connected to the lower portion of the sealant-releasing section. The hollow portion is coupled to the hollow region of the sealant-releasing section for receiving sealant from the hollow region of the sealant-releasing section. The sealing releasing section has a longitudinal axis. The second seal has a longitudinal axis co-axial with the longitudinal axis of the sealing section. The tip is offset from the longitudinal axis of the second seal for insertion into the aperture in the second member, such aperture in the second member being offset from the aperture in the first member.

In one embodiment, the entrance to the probe has a groove disposed in a portion of a sidewall thereof. An alignment plate has an aperture therein. The plate has a key projecting into the aperture of the plate, such key being inserted into the groove.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 1A–1C are sketches showing the application of a sealant using a sealing probe according to the invention;

FIGS. 3A–3B show the effect of sealant introduced into the probe of FIG. 2 on releasing and expanding a flexible tip used with such probe such tip being shown in FIG. 2B;

FIGS. 4A–4B show the effect of sealant introduced into the probe of FIG. 2 on releasing and expanding a bellows tip used with such probe such tip being shown in FIG. 2C;

FIGS. 5A–5C show the effect of sealant introduced into the probe of FIG. 2 on releasing and expanding a tip used with such probe such tip having a piston therein to release and expand a tip;

FIGS. 6A–6C show the effect of sealant introduced into the probe of FIG. 2 on releasing and expanding a flexible tip used with such probe such tip being shown in FIG. 2B where there is an offset between an aperture in an upper member and a lower member;

FIG. 7A shows a probe according to the invention used to introduce sealant into the offset condition shown in FIGS. 6A–6C;

FIG. 7B shows a probe with an offset tip for use in the offset condition shown in FIGS. 6A–6C and 7A, according to the invention;

FIG. 8A shows an alternative probe according to the invention used to introduce sealant into the offset condition shown in FIGS. 6A–6C;

FIG. 8B shows a probe with an offset bellows tip for use in the offset condition shown in FIGS. 6A–6C and 8A, according to the invention;

FIGS. 9A–9C show a combination alignment-depth guide for use with the probe and assembly of such combination alignment-depth guide with such probe.

Like reference symbols in the various drawings indicate like elements.

DETAILED DESCRIPTION

Figure 1C:
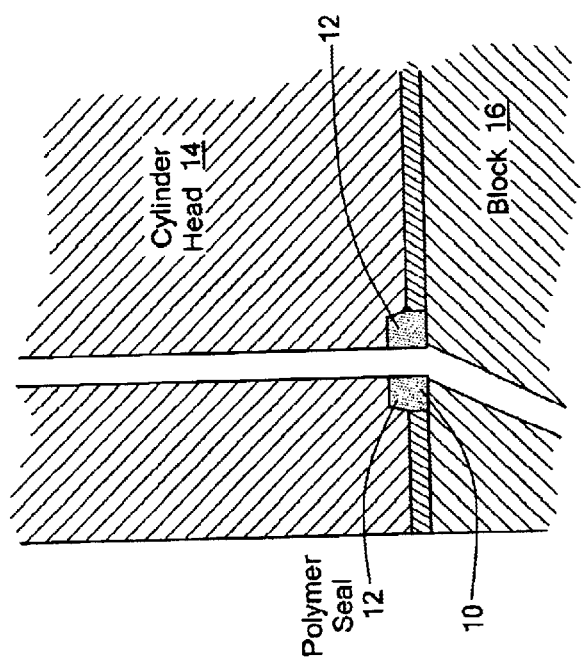

Referring now to FIGS. 1A, 1B and 1C, a process is shown for injecting a sealant 10 into a sealant-receiving region 12 between a pair of members 14, 16. Here the upper member 14 is a cylinder head and the lower member 16 is an internal combustion engine block. A head casket 18 is disposed between the pair of members 14, 16. Each one of the members 14, 16 has an aperture 20, 22, respectively in a surface thereon. The upper member 14 has a hole 24 therethrough, such hole 24 terminating at the aperture 20 therein. The aperture 20 in the upper one of the members 14 is in a lower surface of such upper member 14. The lower member 22 has the aperture 22 therein in an upper surface thereof leading to a passage 26 in the lower member 16. The sealant-receiving region 12 is between portions of the upper and lowers members 14, 16 adjacent to the apertures 20, 22 in the pair of members 14, 16. Here, the apertures 20, 22 are in alignment one with the other.

Figure 2:
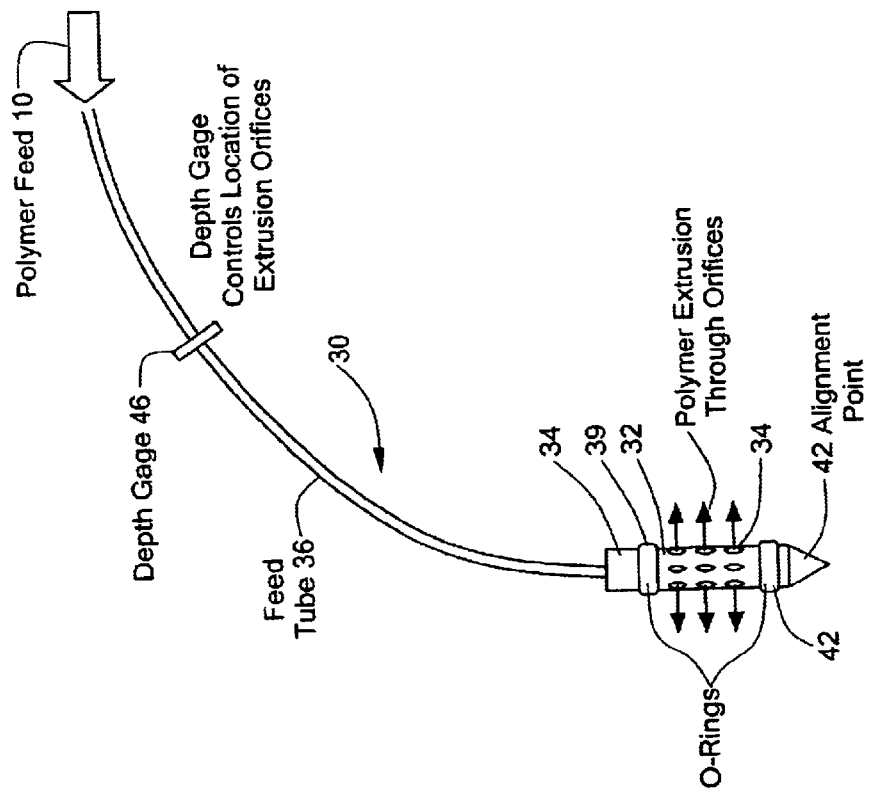
FIG. 2 is a sketch of the sealing probe shown in FIG. 1.

A sealing probe 30, shown more clearly in FIG. 2, is used to inject the sealant 10 into the sealant-receiving region 12, as shown in FIG. 1A. The sealing probe 30 includes a hollow, sealant-releasing section 32, FIG. 2, for insertion into the hole 20 in the upper member 14 and then into at least a portion of the sealant-receiving region 12, as shown in FIG. 1A. The sealant-releasing section 32, FIG. 2, has a plurality of orifices, or apertures 34, disposed about an outer wall of such section 32. The apertures 34 pass through the outer wall from a hollow, interior region within such sealant-releasing section 32 to the sealant-receiving region 12 external to the sealant-releasing section 32. The probe 30 also includes an entrance 34, FIG. 2, adjacent a top portion of the sealant-releasing section 32 for receiving the sealant 10 and passing such sealant 10 (FIGS. 1A–1C) to the hollow, interior region of the sealant-releasing section 32 and then from the hollow, interior region, through the apertures 34, to the sealant-receiving region 12 external the sealant-releasing region 32.

More particularly, the probe 30 (FIG. 2) recited includes a flexible feed tube 36 connected to the entrance 34 of the sealant-releasing section 32 for passing through the hole 24 in the upper member 14, as shown in FIGS. 1A and 1B. The sealant 10 is here a polymer as is injected into the probe 30 through the flexible feed tube 36 under high pressure, as shown in FIG. 1B. The probe 30 also has a first seal 39 disposed about an upper portion of the outer wall. Here, the first seal 39 is an O-ring. The first seal 39 extends beyond the outer surface of the sealant-releasing section 32 to prevent sealant 12 from passing beyond such first seal 39 to portions of the hole 32 above such first seal, as shown in FIG. 1B. The probe 30 also has a second seal 42 disposed adjacent to a lower portion of the outer wall to prevent sealant from passing into the aperture in the lower member, as shown in FIG. 1B. Here, the second seal 42 includes an expandable tip 44, to be described in more detail in connection with FIGS. 2C and 4A–4B to prevent sealant from passing beyond such second seal into passage in the lower member, as shown in FIG. 1B. The tip 44 at the lower portion of the probe 30 facilitates in the introduction into the aperture 32 in the lower member 16.

After injection of the sealant 10, the probe 30 is removed as shown on FIG. 1C leaving the sealant 10 in the sealant-receiving region 12, as shown.

Referring to FIG. 2, the probe 30, it is noted that here the probe has a depth gage 46 connected to the flexible feed tube 36. The depth gage 46 also is an alignment device and will be described in more detail in connection with FIGS. 9A and 9B.

Figure 2A:
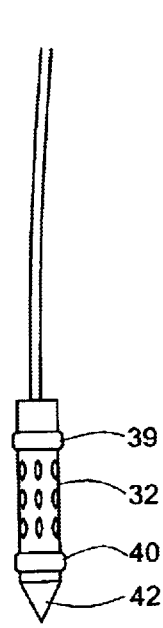
FIGS. 2A–2D are sealing probes of FIG. 2 having a variety of tips therefor according to the invention.
Figure 2B:
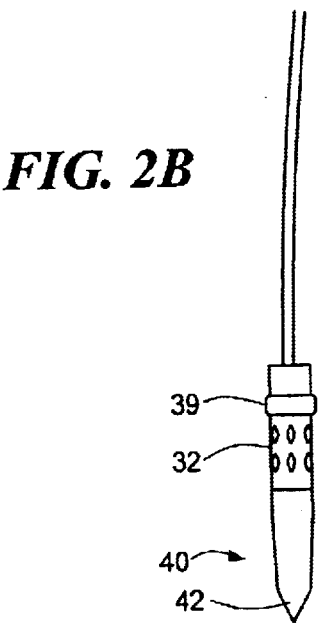
Figure 2C:
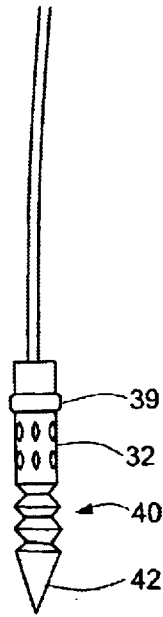
Figure 2D:
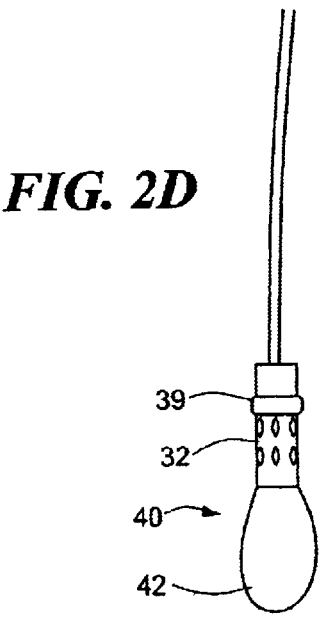

Referring now to FIGS, 2A, 2B, 2C and 2D, a variety off tips 42 for the probe 30 is shown. FIG. 3A shows a rigid tip. Here, the second seal 40 is an O-ring. Referring to FIG. 2B, the second seal 40 includes a sealant inflatable tip 42. More particularly, the second seal 40 includes a hollow flexible tip 42 connected to the lower portion of the sealant-releasing section 32, such hollow portion being coupled, i.e., in communication with, the hollow region of the sealant-releasing section 32 for receiving sealant 10 from the hollow, interior region of the sealant-releasing section 32. FIG. 3C shows the second seal 40 having a bellows tip 42, as described above in connection with FIGS. 1A–1C. FIG. 3D shows the second seal 40 having a diaphragm or balloon tip 42. The flexible tips 42 in FIGS. 2B–2D may be initially stored within the hollow, interior region of the hollow, sealant-releasing section 32, as shown in FIGS. 3A–3B for the diagram tip and FIGS. 4A–4B for the bellows tip. Here, the material used for the flexible tips is any suitable elastomer.

Referring to FIGS. 5A–5C, here, a flexible tip includes a piston 46 disposed in the hollow flexible tip 42. The piston 46 has a head 48 in an upper region thereof and a rod 49 at a lower portion thereof. The received sealant 10 forces the head 48 of the piston 46 and the rod 49 connected thereto into the flexible tip to inflate such tip, as shown in FIG. 5C.

Figure 6A:
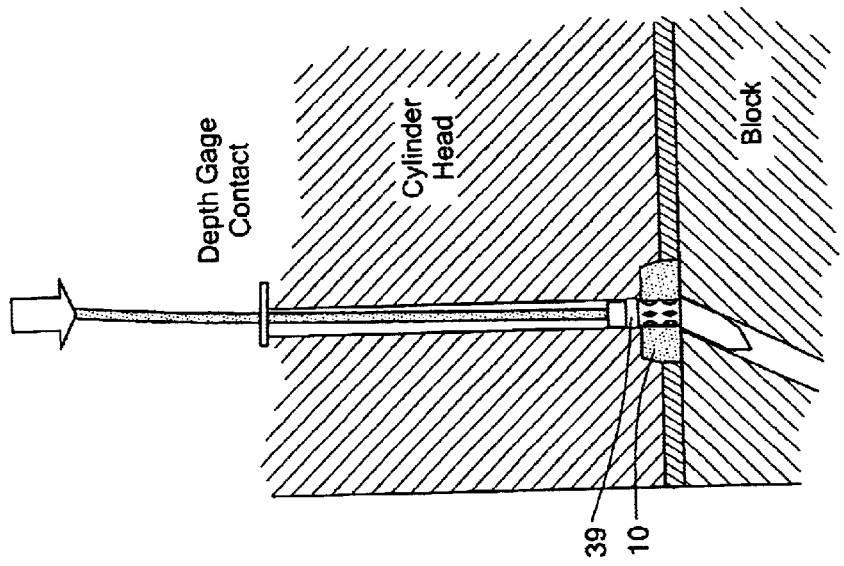
Figure 6B:
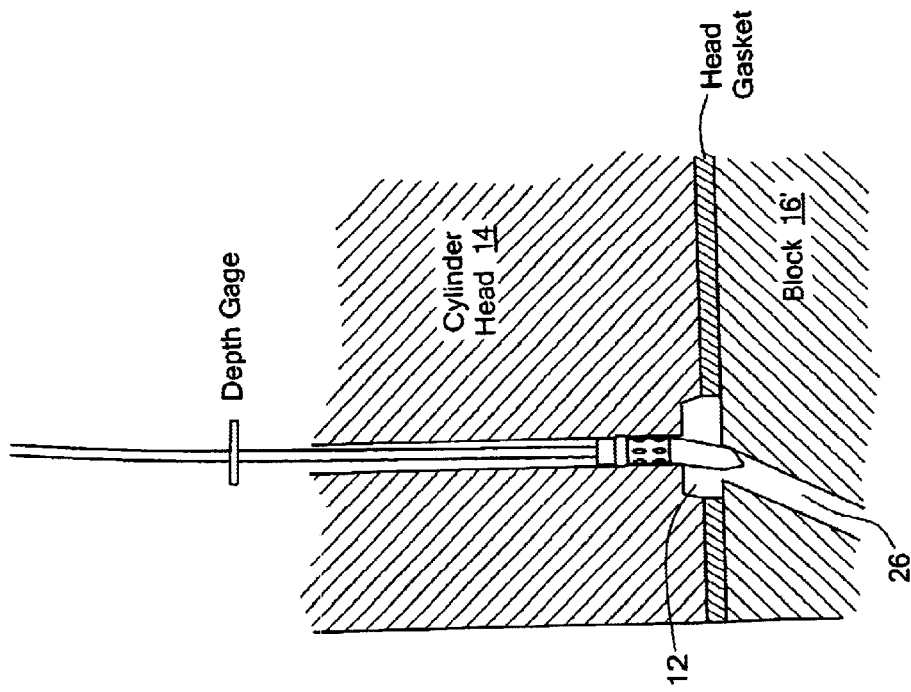

Referring now to FIGS. 6A to 6C, a process is shown for injecting the sealant 10 into a sealant-receiving region 12 between a pair of members 14, 16' where the passage 26' in the lower member 16' is offset from the aperture 30 in the upper member 14. Referring also to FIGS. 7A and 8A, here the second seal 40 of the probe 30 has a longitudinal axis co-axial with the longitudinal axis 50 of the sealant-releasing section 32 with the tip 42 offset from the axis 52 of the aperture 32 in the second member 16', as shown more clearly in FIGS. 7A, 7B, for an inflatable tip, and FIGS. 8A and 8B for a bellows. Again the second seal 40 may be flexible as shown, or rigid as shown.

Referring now to FIGS. 9A–9C, the combination alignment-depth guide 46 (FIG. 2) is shown for the probe 30. Here the entrance 32 (FIG. 9B) of the probe 30 has a groove 62 disposed in a portion of a sidewall thereof. The alignment guide 46 has a plate 64. The plate 64 has an aperture 66 therein. The plate 64 has a key 68 projecting into the aperture 66 of the plate 64, such key 69 being inserted into the groove 62, as shown in FIGS. 9B and 9C. The plate 64 also has alignment holes 70 for fastening the plate 64 to the upper surface of the upper member, FIGS. 1A–1C. After insertion of the plate 64 onto the probe 30, as shown in FIG. 9C, the first seal 39, here an O-ring, is inserted on the probe 30 as shown in FIG. 9C.

A number of embodiments of the invention have been described. Nevertheless, it will be understood that various modifications may be made without departing from the spirit and scope of the invention. Accordingly, other embodiments are within the scope of the following claims.

What is claimed is:

1. A sealing probe, comprising:
   (A) a hollow, sealant-releasing section, such section having:
      (i) a plurality of apertures disposed about an outer wall of such section, such apertures passing through the outer wall from a hollow, interior region within such section to a region external to the sealant-releasing section; and
      (ii) an entrance adjacent a top portion of the sealant section for receiving a sealant and passing such sealant to the hollow, interior region and then from the hollow, interior region, through the apertures, to the region external the sealant-releasing section;
   (B) a first seal disposed about an upper portion of the outer wall, such first seal extending beyond the outer surface of the sealant-releasing section;

(C) a second seal disposed adjacent to a lower portion of the outer wall; and (D) wherein the plurality of apertures are disposed between the first seal and the second seal.

2. The probe recited in claim 1 including a flexible tube connected to the entrance of the sealant-releasing section.

3. The probe recited in claim 1 wherein the first seal includes an O-ring.

4. The probe recited in claim 1 wherein the second seal includes an O-ring.

5. The probe recited in claim 1 wherein the second seal includes a hollow flexible tip connected to the lower portion of the sealant-releasing section, such hollow portion of the second seal being in communication with the hollow, interior region of the sealant-releasing section for receiving sealant from the hollow, interior region of the sealant-releasing section.

6. The probe recited in claim 1 wherein the second seal includes:

a hollow flexible tip connected to the lower portion of the sealant-releasing section;

a piston disposed in the hollow flexible tip, such piston having a head in an upper region of the tip and a rod at a lower portion of the tip, such hollow portion of the tip being in communication with the hollow region of the sealant-releasing section for receiving sealant from the hollow region of the sealant-releasing section, such received sealant forcing the head of the piston and the rod connected thereto into the flexible tip to inflate such tip.

7. The probe recited in claim 1 wherein:

the second seal includes a hollow flexible tip connected to the lower portion of the sealant-releasing section, such hollow portion of the tip being in communication with to the hollow, interior region of the sealant-releasing section for receiving sealant from the hollow region of the sealant-releasing section;

the sealing releasing section has a longitudinal axis;

the second seal has a longitudinal axis co-axial with the longitudinal axis of the sealing section; and the tip is offset from the longitudinal axis of the second seal.

8. The probe recited in claim 5 wherein the second seal is a bellows.

9. The probe recited in claim 5 wherein the second seal is a diaphragm.

10. The probe recited in claim 9 wherein the diaphragm is disposed within hollow, interior region of the sealant-releasing section prior to such within hollow region of the sealant-releasing section receiving such sealant, such diaphragm being forced from within the hollow region of the sealant-releasing section to extend beyond the within hollow region of the sealant-releasing section.

11. The probe recited in claim 4 wherein the first seal includes an O-ring.

12. The probe recited in claim 5 wherein the first seal includes an O-ring.

13. The probe recited in claim 8 wherein the first seal includes an O-ring.

14. The probe recited in claim 9 wherein the first seal includes an O-ring.

15. The probe recited in claim 10 wherein the first seal includes an O-ring.

16. A sealing probe for injecting a sealant into a sealant-receiving region between a pair of members, each one of the members having an aperture in a surface thereon, an upper one of such members having a hole therethrough, such hole terminating at the aperture therein, such aperture in the upper one of the members being in a lower surface of such upper one of the member, a lower one of the pair of members having the aperture therein in a upper surface thereof, such sealant-receiving region being between portions of the upper and lowers members adjacent to the apertures in the pair of members, such probe comprising:

(A) a hollow, sealant-releasing section, for insertion into the hole in the upper member into at least a portion of the sealant-receiving region, such sealant-releasing section having:

(i) a plurality of apertures disposed about an outer wall of such section, such apertures passing through the outer wall from a hollow region within such section to the sealant-receiving region; and (ii) an entrance adjacent a top portion of the sealant section for receiving a sealant and passing such sealant to the hollow region and then from the hollow region, through the apertures, to the region external the sealant-receiving region;

(B) a first seal disposed about an upper portion of the outer wall, such first seal extending beyond the outer surface of the sealant-releasing section to prevent sealant from passing beyond such first seal to portions of the hole above such first seal; and (C) a second seal disposed adjacent to a lower portion of the outer wall to prevent sealant from passing into the aperture in the lower member.

17. The probe recited in claim 16 including a flexible tube connected to the entrance of the sealant-releasing section for passing through the hole in the upper member.

18. The probe recited in claim 16 wherein the first seal includes an O-ring.

19. The probe recited in claim 18 wherein the second seal includes a rigid tip at the lower portion thereof for introduction into the aperture and wherein the second seal includes an O-ring.

20. The probe recited in claim 16 wherein the second seal includes a hollow flexible tip connected to the lower portion of the sealant-releasing section, such hollow portion being coupled to the hollow region of the sealant-releasing section for receiving sealant from the hollow region of the sealant-releasing section.

21. The probe recited in claim 16 wherein the second seal includes:

a hollow flexible tip connected to the lower portion of the second seal;

a piston disposed in the hollow flexible tip, such piston having a head in an upper region thereof and a rod at a lower portion thereof, such hollow portion being coupled to the hollow region of the sealant-releasing section for receiving sealant from the hollow region of the sealant-releasing section, such received sealant forcing the head of the piston and the rod connected thereto into the flexible tip to inflate such tip.

22. The probe recited in claim 16 wherein:

the second seal includes a hollow flexible tip connected to the lower portion of the sealant-releasing section, such hollow portion being coupled to the hollow region of the sealant-releasing section for receiving sealant from the hollow region of the sealant-releasing section;

the sealing releasing section has a longitudinal axis;

the second seal has a longitudinal axis co-axial with the longitudinal axis of the sealing section; and the tip is offset from the longitudinal axis of the second seal for insertion into the aperture in the second member, such aperture in the second member being offset from the aperture in the first member.

23. The probe recited in claim 22 wherein the second seal is a bellows.

24. The probe recited in claim 22 wherein the second seal is a diaphragm.

25. The probe recited in claim 24 wherein the diaphragm is disposed within hollow region of the sealant-releasing section prior to such within hollow region of the sealant-releasing section receiving such sealant, such diaphragm being forced from such to within hollow region of the sealant-releasing section to extend beyond the within hollow region of the sealant-releasing section.

26. The probe recited in claim 22 wherein the first seal includes an O-ring.

27. The probe recited in claim 23 wherein the first seal includes an O-ring.

28. The probe recited in claim 24 wherein the first seal includes an O-ring.

29. The probe recited in claim 25 wherein the first seal includes an O-ring.

30. A sealing probe, comprising:

(A) a hollow, sealant-releasing section, such section having:

(i) a plurality of apertures disposed about an outer wall of such section, such apertures passing through the outer wall from a hollow region within such section to a region external to the sealant-releasing section; and (ii) an entrance adjacent a top portion of the sealant section for receiving a sealant and passing such sealant to the hollow region and then from the hollow region, through the apertures, to the region external the sealant-releasing section;

(iii) such entrance having a groove disposed in a portion of a sidewall thereof;

(B) a first seal disposed about an upper portion of the outer wall, such first seal extending beyond the outer surface of the sealant-releasing section;

(C) a second seal disposed adjacent to a lower portion of the outer wall; and (D) an alignment plate having an aperture therein, such plate having:

a key projecting into the aperture of the plate, such key being inserted into the groove.

* * * * *